(12) United States Patent
Warnicki et al.

(10) Patent No.: US 8,100,197 B2
(45) Date of Patent: Jan. 24, 2012

(54) METHOD AND DEVICE FOR THE PRODUCTION OF BORES

(75) Inventors: Rainer Warnicki, Oberrot (DE); Andreas Peisert, Stuttgart (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 12/987,634

(22) Filed: Jan. 10, 2011

(65) Prior Publication Data

US 2011/0110738 A1 May 12, 2011

Related U.S. Application Data

(62) Division of application No. 11/314,326, filed on Dec. 21, 2005, now abandoned.

(30) Foreign Application Priority Data

Dec. 21, 2004 (DE) .......................... 10 2004 062 858

(51) Int. Cl.
*B23B 35/00* (2006.01)

(52) U.S. Cl. .......................................... 175/57; 408/1 R

(58) Field of Classification Search .................. 175/57, 175/385, 421, 398; 408/213, 214, 216, 227, 408/229, 1 R; 451/358
See application file for complete search history.

(56) References Cited

U.S. PATENT DOCUMENTS

| | | | |
|---|---|---|---|
| 1,425,402 A | 8/1922 | MacKenzie | |
| 1,887,372 A | 11/1932 | Emmons | |
| 4,083,351 A | 4/1978 | Greenspan | |
| 5,441,450 A | 8/1995 | Fein et al. | |
| 5,747,953 A | 5/1998 | Philipp | |
| 5,868,208 A | 2/1999 | Peisert et al. | |
| 6,179,853 B1 * | 1/2001 | Sachse et al. | 606/171 |
| 6,652,202 B2 * | 11/2003 | Remke et al. | 408/214 |
| 2004/0156689 A1 | 8/2004 | Shen | |
| 2009/0050343 A1 | 2/2009 | Smith et al. | |

FOREIGN PATENT DOCUMENTS

| | | |
|---|---|---|
| DE | 540943 C | 12/1931 |
| DE | 4102794 A1 | 8/1992 |
| DE | 4344849 A1 | 7/1995 |
| DE | 19815443 C1 | 12/1999 |
| DE | 1107844 B1 | 11/2003 |
| JP | 3047711 A | 2/1991 |
| JP | 4281995 A | 10/1992 |

(Continued)

OTHER PUBLICATIONS

European Search Report; Application No. EP 05 02 6682; Feb. 27, 2006; 3 pages.

(Continued)

*Primary Examiner* — David Andrews
(74) *Attorney, Agent, or Firm* — St. Onge Steward Johnston & Reens LLC

(57) ABSTRACT

A method and a device for the production of a bore with a special shape, for example a bore which deviates from a cylindrical shape or a bore with an undercut. First, a first bore portion is produced using an oscillatingly driven tool, the first bore portion having a shape deviating from a cylinder and having at least one projection projecting from the wall face of the first bore portion towards the bore center. Subsequently, when a bore with an undercut is to be produced, the tool is then at least partially rotated about its longitudinal axis, in order to produce a second bore portion which has a larger cross section than the first bore portion.

13 Claims, 2 Drawing Sheets

FOREIGN PATENT DOCUMENTS

| | | |
|---|---|---|
| JP | 5029629 A | 2/1993 |
| JP | 5162012 A | 6/1993 |
| JP | 9502134 T | 3/1997 |
| JP | 9174170 A | 7/1997 |
| JP | 2000024838 A | 1/2000 |
| JP | 2000107919 A | 4/2000 |
| JP | 2002337026 A | 11/2002 |
| WO | 9517991 A2 | 7/1995 |

OTHER PUBLICATIONS

European Search Report; Application No. EP 05 02 6682; Jun. 28, 2006; 10 pages.

* cited by examiner

METHOD AND DEVICE FOR THE PRODUCTION OF BORES

CROSS-REFERENCE TO RELATED APPLICATIONS

The present application is a divisional application of U.S. patent application Ser. No. 11/314,326, filed on Dec. 21, 2005, now abandoned which in turn claims priority of German patent application No. 10 2004 062 858.0 filed on Dec. 21, 2004. The contents of all prior applications are incorporated herein by reference.

BACKGROUND OF THE INVENTION

The invention relates to a tool for the production of specially shaped bores, such as non-round bores and bores with an undercut, furthermore to a tool kit for the production of such bores, to a method for the production of bores and to a device the production of bores.

Drilling typically involves working into solid material or else making a core-hole bore by means of a drill bit. In all known drilling methods, the bore made has an approximately cylindrical shape.

In many instances, however, it will be desirable to be able to produce bores which have a shape deviating from a cylindrical shape. Furthermore, it will be desirable to be able to produce bores with an undercut. That is to say, it will be advantageous if bores could be produced in which a first bore portion with a first cross section has adjoining it a second bore portion with a larger cross section. Such bores with an undercut will be extremely helpful in a wide diversity of embodiments in assembly technology. To be precise, anchoring elements, such as expanding dowels or the like, could then be attached at the undercut.

There has hitherto been no known simple and reliable possibility of being able to produce bores of this type.

SUMMARY OF THE INVENTION

It is a first object the invention to disclose a tool suitable for the production of bores having a shape other than a cylindrical shape.

It is a second object the invention to disclose a method suitable for the production of bores having a shape other than a cylindrical shape.

It is a third object of the invention to disclose a tool suitable for the production of bores having a shape other than a cylindrical shape in hard materials such as stone, rock or brickwork.

These and other objects of the invention are achieved by a method for the production of a bore, comprising the following step (a):

Production of a first bore portion by means of an oscillatingly driven tool, the first bore portion having a shape deviating from a cylinder and having at least one projection projecting from the wall surface of the first bore portion towards the bore centre.

The object of the invention is thereby achieved in full.

According to the invention, in step (a), with the aid of an oscillatingly driven tool a first bore portion is produced, which has a shape deviating from a cylinder and has projections projecting from the wall face of the first bore portion towards the bore centre.

Thus, by means of an oscillatingly driven tool, a bore shape which deviates from a cylindrical shape can be produced.

In a development of the method according to the invention, after the first bore portion has reached a desired bore depth, step (a) is followed by a second step (b), in which an at least partial rotation of the tool about its longitudinal axis takes place, in order to produce a second bore portion which has a larger cross section than the first bore portion.

By the tool being at least partially rotated about its longitudinal axis in the second work step (b), an enlarged bore portion is then produced in the bore region adjoining the first bore portion and has a larger cross section than the first bore portion. After a complete revolution of the tool has been executed, the second bore portion has, as a rule, an approximately cylindrical shape. This gives rise, at the transition between the first and the second bore portion, to one or more undercuts, the shape of which is dependent on the shape of the tool used.

In an advantageous development of the invention, in step (b), the tool is rotated by hand or is driven in rotation or intermittently with a preferred direction.

Particularly in the case of an intermittent drive with a preferred direction, when drilling is being carried out in rock, the desired enlargement of the drillhole in the region of the second bore portion can gradually be produced in a simple way.

According to a further refinement of the invention, a pre-bore is first made before step (a).

This makes it easier to produce the first bore portion, since the tool used can be guided at the pre-bore by means of an attachment or the like, so that it is prevented from running away sideways.

According to a further refinement of the invention, a pre-bore is made during step (a).

By a suitable combination tool being used, the production of the bore can thus be further simplified.

As regards the tool, the object of the invention is achieved by means of a tool with a shank which has a first end and a second end, the first end being designed for chucking on an oscillatory drive, and there being provided at the second end a cutting head with at least one projection which projects with respect to the shank in the radial direction and is provided with cutting means.

Using a tool of this type, with the aid of an oscillatory drive, a first bore portion can be produced in the way described above, which has a shape deviating from a cylinder and possesses at least one projection projecting from the wall face of the first bore portion towards the bore centre.

Insofar as this is desirable, in a second work step, when the first bore portion has reached a sufficient depth, the tool can be rotated about its longitudinal axis in order to produce the second bore portion which has a larger cross section than the first bore portion.

In an advantageous development of the invention, the cutting head of the tool has at least two, preferably three, projections which are preferably arranged at equal angular intervals in relation to one another, depressions being formed between adjacent projections.

By means of a configuration of this type, a rotationally symmetrical construction of the cutting head is made possible, thus counteracting a running away of the latter sideways during the production of the bore.

According to a further refinement of the invention, abrasive cutting means and/or cutting teeth are provided on at least one projection of the cutting head.

In addition, cutting means may also be provided on at least one end face.

In this instance, the cutting means may comprise diamond cutting means, boron carbide cutting means, corundum cutting means or the like.

This makes it easier to produce the first bore portion by means of the oscillatory drive.

According to a further refinement of the invention, at least one outer surface of a projection has a design approximately in the form of an arc of a circle.

The generation of vibrations is thereby kept low.

According to a further refinement of the invention, the tool has a drill attachment.

This is preferably aligned with a longitudinal axis of the shank.

Thus, by means of a single operation, both a pre-bore for guiding the tool can be made and at the same time the oscillating cut-drilling operation can be carried out by means of the cutting head.

According to a further refinement of the invention, at least the cutting means or the drilling attachment are designed for rock drilling or for drilling into wood.

For this purpose, for example when diamond cutting means or drilling cutting means are used, a suitable binding of the cutting means by means of a metallic layer or a plastic layer may be provided.

According to a further version of the invention, furthermore, a kit for the production of a bore with an undercut is specified, the said kit comprising a tool of the type described above and a drill adapted to this.

By means of a kit of this type, in separate operations, first a pre-bore can be made and subsequently, in a further work step, the bore with an undercut can be made.

The object of the invention is achieved, furthermore, by means of an oscillatory drive with an oscillatory device, by means of which a drive shaft can be oscillationly driven to-and-fro about its longitudinal axis, furthermore a tool of the type described above being coupled to the drive shaft.

According to a preferred development of this version, the oscillatory drive comprises means for the generation of angular momentums.

By virtue of such a design of the oscillatory drive, an improved propulsion can be achieved both during the production of the first bore portion and during the production of the second bore portion.

According to a further refinement of the invention, the oscillatory device can be changed over between a to-and-fro oscillation about a longitudinal axis of the drive shaft and an oscillation with angular momentums in a preferred direction of rotation.

In this way, using a to-and-fro rotational oscillation, both the first bore portion and the second bore portion having the enlarged bore cross section can be produced in an especially simple and advantageous way.

It goes without saying that the features mentioned above and those yet to be explained below can be used not only in the combinations specified in each case, but also in other combinations or alone, without departing from the scope of the invention.

BRIEF DESCRIPTION OF THE DRAWINGS

Further features and advantages of the invention may be gathered from the following description of preferred exemplary embodiments, with reference to the drawing in which.

DETAILED DESCRIPTION OF THE PREFERRED EMBODIMENTS

Figure 1:
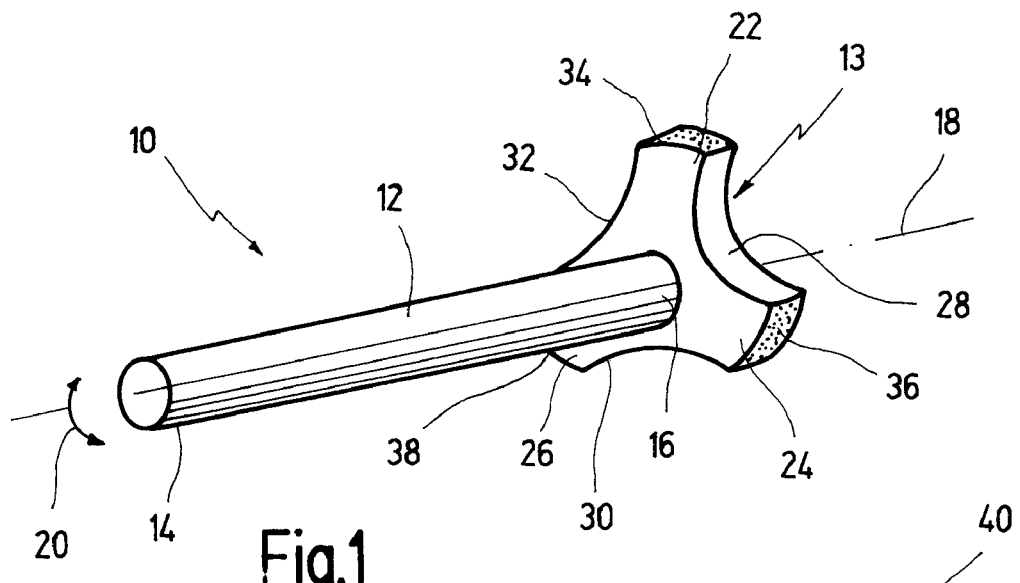
FIG. 1 shows a first version of a tool according to the invention in a perspective illustration.

A tool according to the invention is designated as a whole by the numeral 10 in FIG. 1.

The tool 10 comprises a cylindrical shank 12 with a first end 14 and with a second end 16. The tool 10 can be chucked with its first end 14 into a clamping chuck of an oscillatory drive (cf. FIG. 4). At the second end 16 of the shank 12 is provided a cutting head 13 which has three outwardly projecting projections 22, 24, 26 which are offset at uniform angular intervals of 120° in relation to one another. A depression 28, 30, 32, which has a concave shape, is formed in each case between adjacent projections 22, 24, 26. The projections 22, 24, 26 have a design approximately in the form of an arc of a circle on their surfaces 34, 36, 38 facing away from the shank 12 and are provided with cutting means in the form of abrasive diamond grains which are held in a suitable way, preferably by means of a metallic layer, on the surface curved in each case. Preferably, in addition, that end face 47 of the cutting head 13 which faces away from the shank 12 is also provided with suitable cutting means. These, too, may again be, for example, abrasive diamond grains which are bound in a suitable way.

It goes without saying that, instead, any other desired cutting means may also be provided, and that even cutting teeth or otherwise shaped cutting elements may be attached to the cutting head.

As indicated by the double arrow 20 in FIG. 1, the tool, when fastened with its first end 14 to an oscillatory drive, can be driven to and fro in oscillation about its longitudinal axis 18. In this instance, the oscillating movement takes place preferably at a high frequency of between about 5,000 and 25,000 oscillations per minute and with a small pivot angle of between about 0.5 and 5°.

Thus, by means of the cutting head 13, a first bore portion, for example in brickwork, can be produced, the shape of which corresponds essentially to the shape of the cutting head 13 as a result of the oscillations having a small pivot angle.

Figure 2:
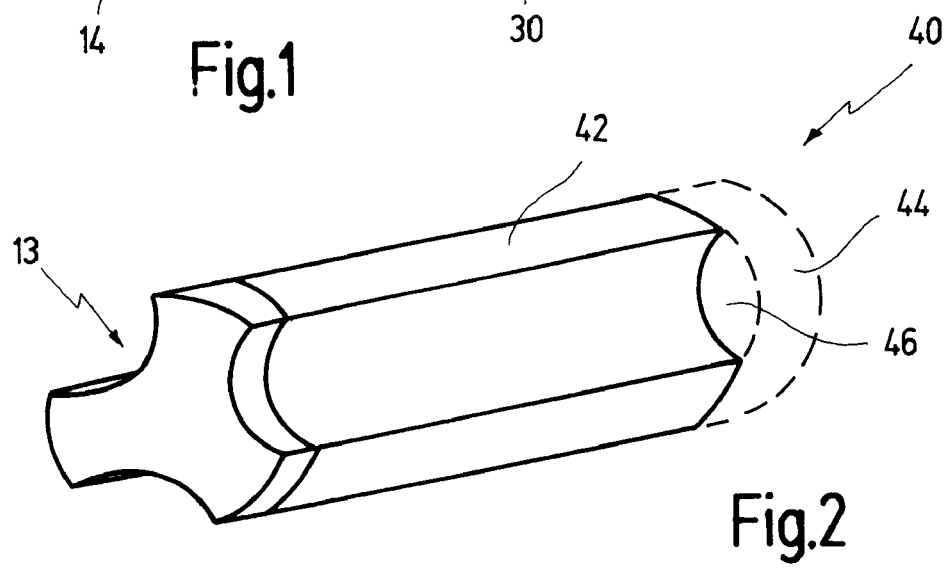
FIG. 2 shows a diagrammatic illustration of a bore shape produced according to the invention.

This is illustrated diagrammatically in FIG. 2. Thus, by means of the tool 10, using an oscillatory drive, a first bore portion 42 can be produced, which has a surface deviating from a cylindrical shape, and, between cylindrical part-faces, the shape of which corresponds approximately to the shape of the projections 22, 24, 26 of the tool 10, again corresponding projections are produced which correspond approximately to the negative shape of the depressions 28, 30, 32 of the tool 10. This results in the shape, illustrated in FIG. 2, of the first bore portion 42.

When the bore has reached the desired depth, then, if a bore with an undercut is to be produced, the entire machine can be rotated gradually about the longitudinal axis 18. Thus, in the end region in which the cutting head 13 is located, the negative shape, predetermined by the preceding oscillation step, of the cutting head 13 is gradually enlarged into a cylindrical bore portion which is indicated in FIG. 2 by dashes as the second bore portion 44. This results, in the second bore portion 44, in an enlargement of the cross section of the bore to a fully cylindrical shape, in so far as a rotation of at least 360° is implemented.

As a result, therefore, a bore 40 is produced which has a first bore portion 42 and a second bore portion 44, undercuts 46 being obtained at the transition between the first bore portion 42 and the second bore portion 44.

Figure 3:
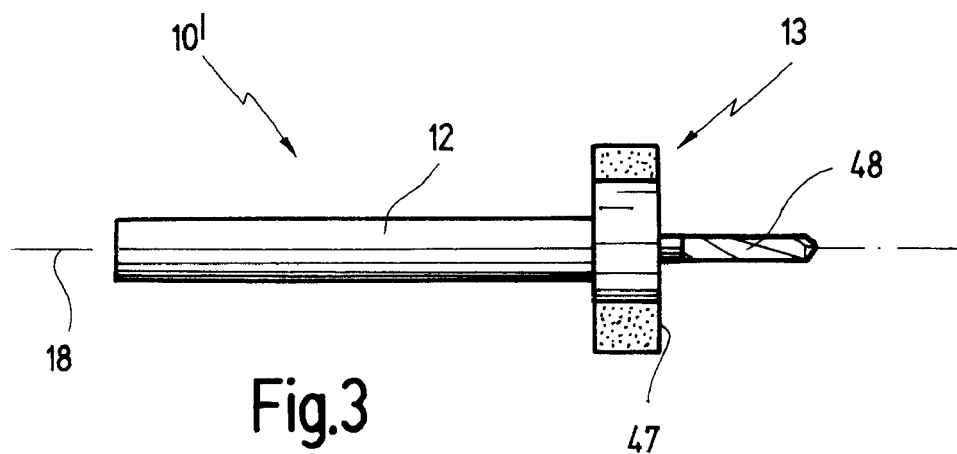
FIG. 3 shows a side view of a further embodiment of a tool according to the invention.

In FIG. 3, an alternative version of a tool according to the invention is illustrated in a side view and is designated as a whole by the numeral 10'. Once gain, the tool 10' has a shank 12 and a cutting head 13 at its second end. On that side of the cutting head 12 which lies opposite the shank 12, a drill attachment 48 is provided, which is aligned with the longitudinal axis 18 of the shank 12. The drill attachment 48, which may be designed, for example, as a rock drill, makes it possible, in one operation with the tool 10', first to make a pre-bore and simultaneously, after a specific depth is reached, to carry out the oscillation operation in order to produce the first bore portion. In this instance, the tool 10' is centred at the bore produced by the drill attachment 48 and therefore cannot creep out sideways.

It goes without saying that, instead of a combination of a drill attachment with the tool, only a tool according to FIG. 1 could also be used, and that a pre-bore is first made in another operation by means of a conventional drill. In this case, a centring attachment will be provided preferably on that side of the cutting head 13 which faces away from the shank 12, so that the tool can be guided by means of the centring attachment at the bore which was previously made.

It goes without saying, furthermore, that that shape of the cutting head 13 which is described with reference to FIG. 1 is merely by way of example. As many projections as desired, which project radially outwards with respect to the shank 12, may therefore be provided. Furthermore, the shape of the projections may be modified in a wide variety of ways. Also, the shape of the outer surfaces 34, 36, 38 can be adapted to the respective conditions in a wide variety of ways. Finally, the depressions 28, 30, 32 may have the most diverse possible shapes and sizes.

What the various versions have in common, however, is that the cutting head must have at least one projection which projects radially outwards with respect to the shank, so that, when the first bore portion is being produced, a bore shape deviating from a cylinder is produced by means of oscillation assistance.

Figure 4:
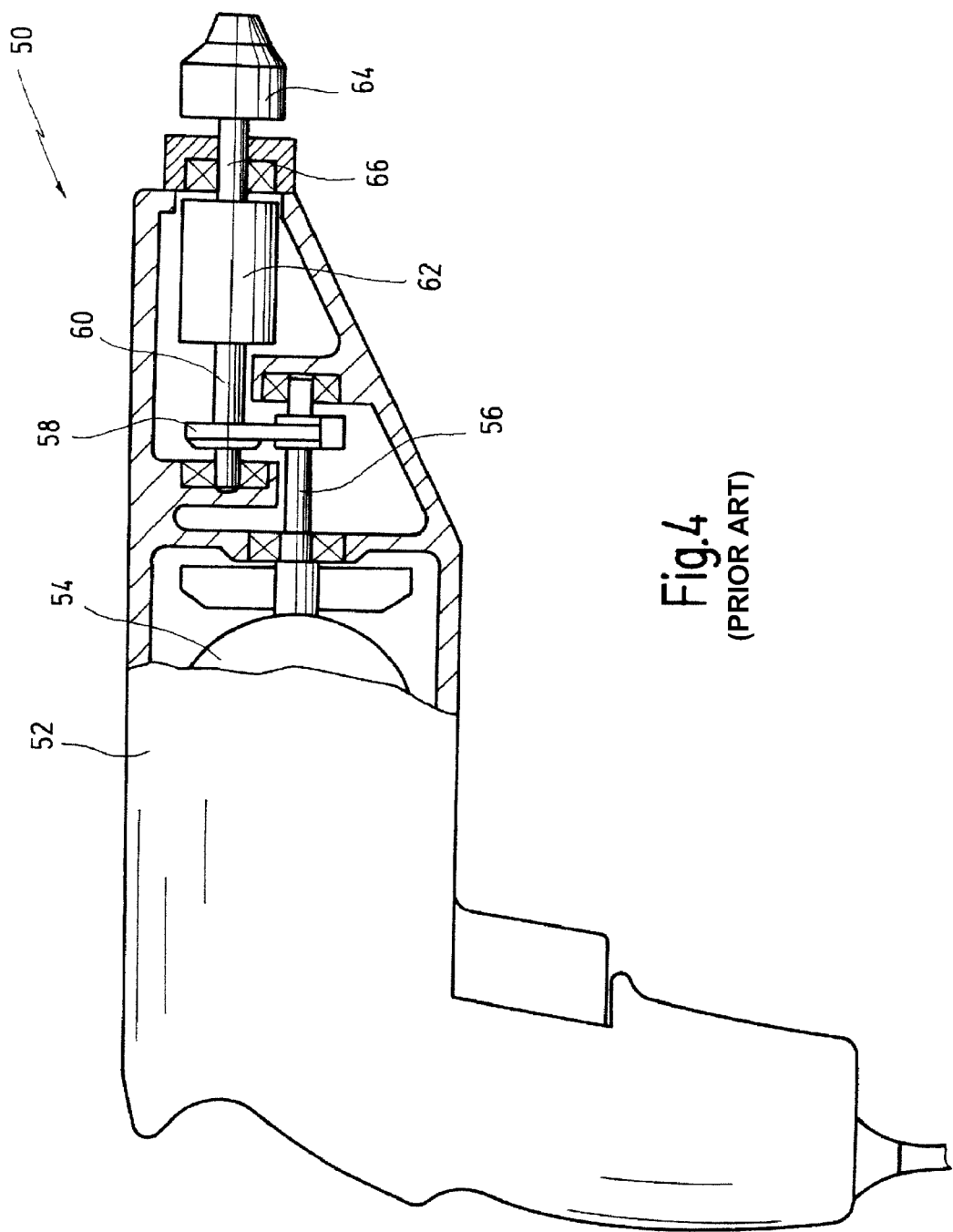
FIG. 4 shows a partially sectional side view of an oscillatory drive which can be used advantageously with the tool according to the invention.

An oscillatory drive, which may advantageously be used in conjunction with the tool according to the invention, is illustrated in FIG. 4 and is designated as a whole by the numeral 50.

This is an oscillatory drive of the type basically known from WO 95/17991 A2. According to this, a drive, the output shaft of which executes an intermittent rotational movement, can be coupled to a drive shaft for a tool via an overrunning clutch. The intermittent rotational movement is thereby converted into a momentum-like rotational movement with a preferred direction of rotation.

In a modification of the drives known from WO 95/17991 A2, however, the overrunning clutch may be set up so that the oscillatory drive 50 has two operating modes, to be precise a first operating mode, in which the tool chucked in it is set in a to-and-fro rotational oscillation movement about its longitudinal axis, and a second operating mode, in which the tool is driven with angular momentums in a preferred direction of rotation.

The oscillatory drive 50 illustrated in FIG. 4 has a housing 52 which receives an electric motor 54. The motor shaft 56 of the electric motor 54 drives an oscillatory device 58 which, for example, has a pivoting fork cooperating with an eccentric. By means of the oscillatory device 58, the rotational movement of the motor shaft 56 is converted into a rotational pivoting movement of a shaft 60. The shaft 60 drives a freewheel 62. The latter is connected on the output side to a drive shaft 66, on which is provided a tool-holding fixture 64, for example a clamping chuck, for receiving a tool 10 or 10'. The freewheel 62 can be changed over between rigid punching drive and overrun action. Thus, in a first position (rigid shaft output), the oscillating movement of the shaft 60 is transmitted directly to the drive shaft 66. This operating mode makes it possible to produce the first bore portion 42 by means of the rotational movement oscillating to and fro. When the second bore portion 44 is subsequently to be produced, the freewheel 62 is changed over, so that the oscillating movement of the shaft 60 is converted into angular momentums with a preferred direction (right-handed rotation or left-handed rotation). The second bore portion can thus be produced in an especially simple way with the aid of the oscillatory drive 50.

As regards the design of the oscillatory drive 50, reference is made in detail to WO 95/17991 A2, the disclosure of which is included in full by reference. In a modification of the known design, however, the freewheel 62 is designed to be capable of being changed over, as mentioned above.

It goes without saying that, instead of an oscillatory drive capable of being changed over, only a simple oscillatory drive could also be used, which generates only a to-and-fro oscillating movement of the tool. The second bore portion could then be produced, for example, by means of the gradual rotation of the machine while the oscillatory drive is running.

What is claimed is:

1. A method for producing a bore in a workpiece, comprising the following steps:
   (a) producing a first bore portion using an oscillatingly driven tool, said first bore portion having a shape deviating from a cylinder with at least one projection projecting from a wall face of said first bore portion towards a center of said first bore portion;
   (b) rotating the tool at least partially about its longitudinal axis for producing a second bore portion having a cross section that is larger than a cross section of said first bore portion; and
   (c) removing the tool through said first bore portion without separating said first bore portion from the workpiece.

2. The method of claim 1, wherein, in step (b), the tool is rotated by a method selected from the group consisting of rotating by hand, driving in rotation and driving intermittently with a preferred direction.

3. The method of claim 1, wherein a pre-bore is first made before performing step (a).

4. The method of claim 1, wherein a pre-bore is made during step (a).

5. The method of claim 1, wherein a tool is used for producing the bore comprising:
   a shank having a first end and a second end, said first end being oscillatingly driven;
   a cutting head located at said second end and having at least one projection radially protruding from said shank; and
   a cutting means provided on said cutting head.

6. The method of claim 5, wherein the cutting head of said tool comprises at least two projections being arranged at equal angular intervals in relation to one another, depressions being formed between adjacent projections.

7. The method of claim 6, wherein each projections of said tool comprises a cutting means provided on an end surface of said projection facing away from said shank.

8. The method of claim 6, wherein each projections of said tool has at least one outer surface having substantially the shape of a partial arc of a circle.

9. The method of claim 5, wherein said cutting means of said tool is selected from the group consisting of an abrasive cutting means and a cutting tooth.

10. The method of claim 5, wherein said cutting means of said tool is located on at least one end face of said at least one projection.

11. The method of claim 5, wherein said at least one projection of said tool has at least one outer surface having substantially the shape of a partial arc of a circle.

12. The method of claim 5, wherein said tool further comprises a drill attachment which is aligned with a central axis of said shank.

13. The method of claim 5, wherein said tool has an outer surface substantially formed in the shape of a partial arc of a circle.

* * * * *